US005830982A

United States Patent [19]
Stouffer et al.

[11] Patent Number: 5,830,982
[45] Date of Patent: *Nov. 3, 1998

[54] PRODUCTION OF POLY (ETHYLENE TEREPHTHALATE)

[75] Inventors: Jan M. Stouffer, Washington, W. Va.; Elwood Neal Blanchard, Wilmington, Del.; Kenneth Wayne Leffew, Kennett Square, Pa.

[73] Assignee: E. I. du Pont de Nemours and Company, Wilmington, Del.

[ * ] Notice: The term of this patent shall not extend beyond the expiration date of Pat. No. 5,510,454.

[21] Appl. No.: 833,685

[22] Filed: Apr. 8, 1997

Related U.S. Application Data

[63] Continuation-in-part of Ser. No. 577,987, Dec. 22, 1995, which is a continuation-in-part of Ser. No. 561,686, Nov. 22, 1995, abandoned, which is a continuation-in-part of Ser. No. 525,241, Sep. 8, 1995, Pat. No. 5,532,333, which is a division of Ser. No. 376,600, Jan. 20, 1995, Pat. No. 5,510,454.

[51] Int. Cl.$^6$ .............................. C08G 63/20; C08F 6/00
[52] U.S. Cl. ..................... 528/308.3; 528/296; 528/298; 528/300; 528/301; 528/302; 528/307; 528/308; 528/308.3; 528/308.6; 528/481; 528/492; 525/437
[58] Field of Search ..................................... 528/296, 298, 528/300, 302, 301, 308, 307, 308.3, 308.6, 481, 492, 503; 525/437

[56] References Cited

U.S. PATENT DOCUMENTS

| | | | |
|---|---|---|---|
| 3,405,098 | 10/1968 | Heighton et al. | 528/308.5 |
| 3,544,525 | 12/1970 | Balint et al. | 528/483 |
| 4,064,112 | 12/1977 | Rothe et al. | 528/272 |
| 4,165,420 | 8/1979 | Rinehart | 526/63 |
| 4,254,253 | 3/1981 | Brent, Jr. et al. | 528/272 |
| 4,271,287 | 6/1981 | Shah | 528/272 |
| 4,276,208 | 6/1981 | Ogawa et al. | 523/217 |
| 4,436,782 | 3/1984 | Ho | 428/402 |
| 4,612,363 | 9/1986 | Sasaki et al. | 528/274 |
| 4,619,987 | 10/1986 | Saiki et al. | 528/274 |
| 4,758,616 | 7/1988 | Okano et al. | 524/399 |
| 5,243,020 | 9/1993 | Ghisolfi | 528/272 |
| 5,334,669 | 8/1994 | Ghisolfi | 525/437 |
| 5,376,734 | 12/1994 | Al Ghatta | 525/437 |

FOREIGN PATENT DOCUMENTS 0 422 282 A1  4/1991  European Pat. Off. .

OTHER PUBLICATIONS

N. S. Murthy et al., *Polymer*, 31, 996–1002, (1990).
A. Siegman et al., *J. Polym. Sci., Polym. Phys. Ed.*, 18, 2181–2196, (1980).
C. M. Roland, *Poly. Eng. Sci.*, 81, 849–854, (1991).

*Primary Examiner*—Samuel A. Acquah

[57] ABSTRACT

Disclosed herein is a novel crystalline form of low molecular weight poly(ethylene terephthalate). This crystalline form may be produced from molten or glassy low molecular weight poly(ethylene terephthalate) material by means of rapid heat transfer to or from the material. The poly(ethylene terephthalate) composition is suitable for use as a starting material for solid-state polymerization in order to produce polymers of higher molecular weight. A higher molecular weight polymer product having a unique physical form can be produced by solid-state polymerization of the low molecular weight poly(ethylene terephthalate).

42 Claims, 3 Drawing Sheets

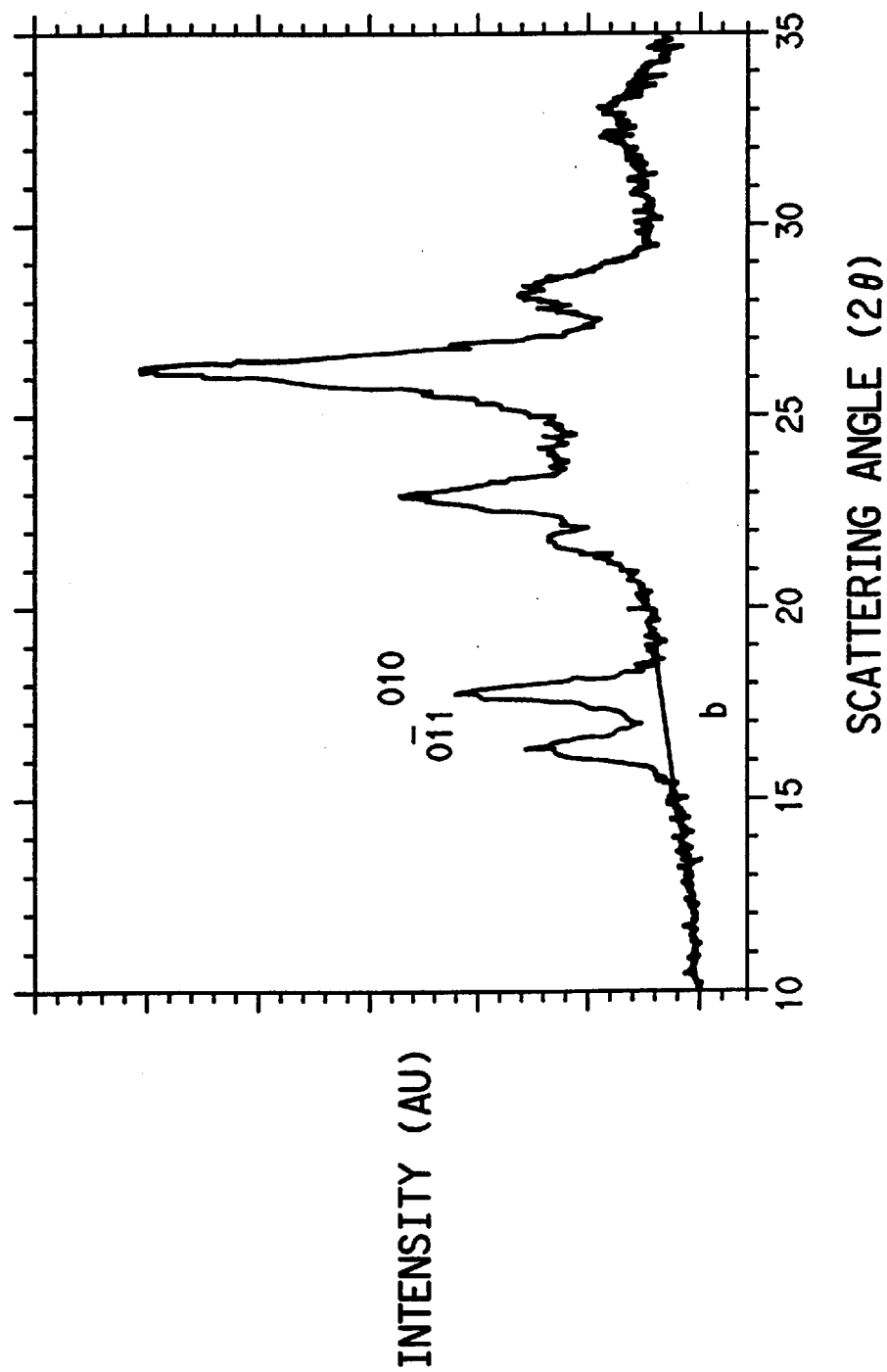

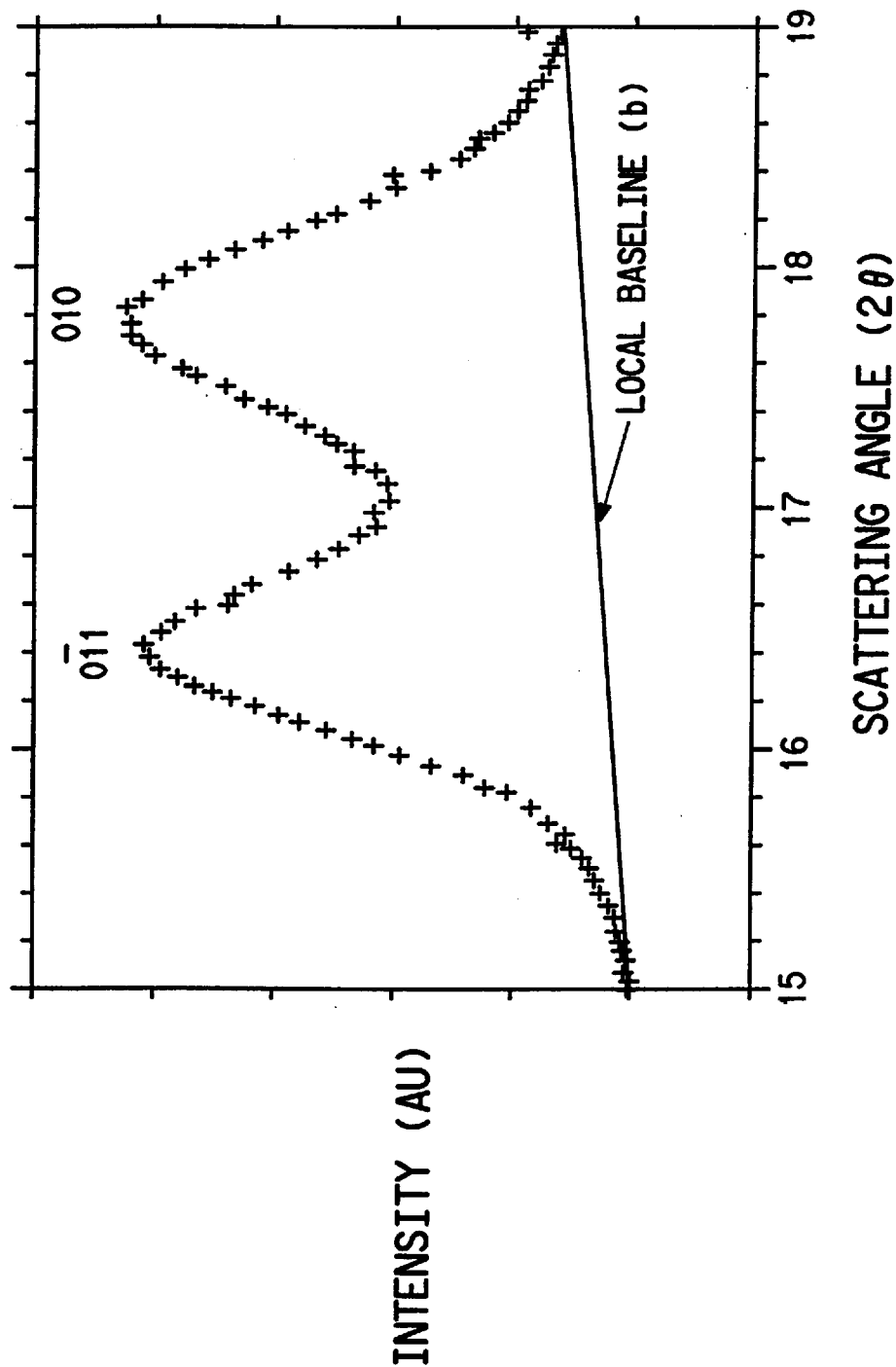

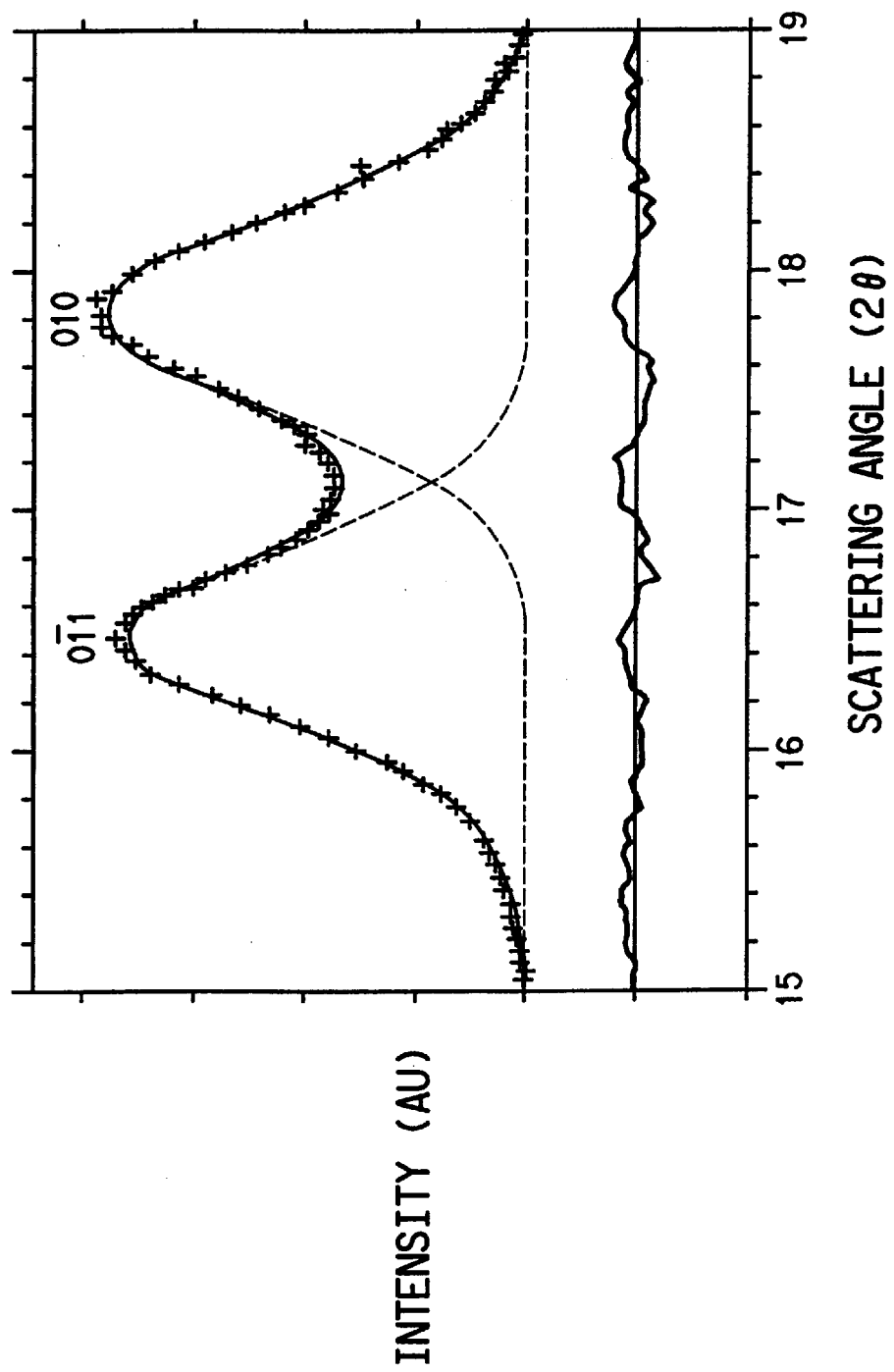

PRODUCTION OF POLY (ETHYLENE TEREPHTHALATE)

This application is a continuation-in-part of Ser. No. 08/577,987, filed Dec. 22, 1995, which is a continuation-in-part of Ser. No. 08/561,686, filed on Nov. 22, 1995 now abandoned, which is a continuation-in-part of Ser. No. 08/525,241, filed Sep. 8, 1995 now U.S. Pat. No. 5,532,333, which is a division of Ser. No. 08/376,600, filed Jan. 20, 1995 now U.S. Pat. No. 5,510,454.

FIELD OF THE INVENTION

This invention concerns a process for obtaining a novel form of low molecular weight poly(ethylene terephthalate) and its use in solid-state polymerization to obtain a higher molecular weight polymer. A novel product of a solid-state polymerization is also disclosed.

TECHNICAL BACKGROUND

Poly(ethylene terephthalate), herein abbreviated PET, is widely used in many materials and products, such as fibers, fabrics, molding resins, and soda bottles. Most of these uses require a polymer of relatively high molecular weight. Such polymers have been commercially made by raising, either in melt or solid-state polymerization, the molecular weight of a prepolymer or oligomer.

Melt polymerizations require higher temperatures, which is more likely to cause polymer decomposition, and expensive equipment. Solid-state polymerizations, in contrast, are usually run at somewhat lower temperatures. Solid-state polymerizations also have the advantage, compared to melt polymerizations, that very high molecular weights, where melt viscosities would otherwise be extremely high, can be more readily obtained. In commercial use, however, solid-state polymerizations may be relatively slow. Furthermore, solid-state polymerizations usually require that the lower molecular weight PET, in the form of particles or pellets, undergo a relatively lengthy crystallization process prior to being polymerized in the solid-state. Therefore, better polymerization methods for PET are desired.

N. S. Murthy, et al., *Polymer*, vol. 31, p. 996–1002; C. M. Roland, *Polym. Eng. Sci.*, vol. 31, p. 849–854; and A. Siegman, et al., *J. Polym. Sci., Polym. Phys. Ed.*, vol. 18, p. 2181–2196 (1980) all report on the properties, particularly the crystalline properties, of various PET polymers. None of these polymers disclose or teach the novel form of PET, and their associated properties, claimed herein.

U.S. Pat. Nos. 3,405,098, 3,544,525, 4,064,112, 4,165,420, 4,254,253, and 4,271,287, and F. Pilati in G. Allen, et al., Ed., *Comprehensive Polymer Science*, Vol. 5, p. 201–216 (Pergamon Press, Oxford 1989) describe various aspects of solid-state polymerization and/or the preparation of PET for use in solid-state polymerization. None of these patents or references discloses the novel processes or compositions of the present invention.

SUMMARY OF THE INVENTION

This invention concerns a composition, comprising, poly (ethylene terephthalate) having a degree of polymerization of about 5 to about 35, an average apparent crystallite size of 9 nm or more, and a melting point of 270° C. or less.

This invention also concerns a process for crystallizing poly(ethylene terephthalate), comprising, cooling at a rate sufficient to cool a molten poly(ethylene terephthalate) or, alternatively, heating at a rate sufficient to heat a glassy poly(ethylene terephthalate) particle to a temperature of about 120° C. to about 210° C. This process produces a crystalline poly(ethylene terephthalate) having an average apparent crystallite size of 9 nm or more and a melting point of 270° C. or less and a poly(ethylene terephalate) having a degree of polymerization of about 5 to about 35. By "degree of polymerization" is meant a statistical average, since such polymeric molecules usually have a distribution of molecular weights. By the term "average" with respect to apparent crystallite size is meant the numerical average of one or more (preferably three or more) measurements on the same batch of polymer. Multiple measurements may be used to insure reproducibility, because of the relatively small sample size used in the x-ray measurement.

More particularly, disclosed herein is a process for the crystallization of pellets of poly(ethylene terephthalate), comprising:

heating pellets of a glassy poly(ethylene terephthalate) pellet to a bulk average temperature of 120° C. to about 210° C. within specified maximum period of time and, furthermore, maintaining the pellets at that bulk average temperature for a specified minimum period of time; or cooling molten droplets (meaning small portions) of a poly(ethylene terephthalate) so that the bulk average temperature of the droplets or crystallizing pellets is brought to a temperature of 120° C. to about 210° C. within a specified maximum period of time and, furthermore, maintaining the crystallizing pellets at that bulk average temperature for a specified minimum period of time;

provided that said poly(ethylene terephthalate) has a degree of polymerization of about 5 to about 35.

This invention also concerns a process for the solid-state polymerization of poly(ethylene terephthalate), wherein the improvement comprises, starting with a poly(ethylene terephthalate) having an average apparent crystallite size of 9 nm or more, a melting point of 270° C. or less, and a degree of polymerization of about 5 to about 35.

Finally, a polymer product is disclosed that comprises a polyethylene terephthalate polymer having an intrinsic viscosity of 0.65 or more, an average apparent crystallite size of 9.0 nm or more, and a heat of fusion of 95 J/g or less.

BRIEF DESCRIPTION OF THE DRAWINGS

FIG. 1 is an illustrative X-ray diffraction pattern of a sample of a PET polymer according to the present invention.

FIG. 2 is another illustrative X-ray diffraction pattern of a sample of a PET polymer according to the present invention.

FIG. 3 is an illustrative X-ray diffraction pattern of a sample of a PET polymer according to the present invention, which pattern has been deconvoluted into two overlapping Gaussian peaks.

DETAILS OF THE INVENTION

A novel composition of poly(ethylene terephthalate), also referred to as PET, is disclosed herein. This novel composition is characterized by a certain kind of crystalline morphology and other desirable characteristics. Related characteristics are also disclosed. By PET or poly(ethylene terephthalate) herein is meant poly(ethylene terephthalate) which may be modified with small amounts, less than 10 mole percent, and more preferably less than 5 mole percent of the polymer repeat units, of copolymerized monomers (or "co-repeat units"), so long as the crystallization behavior of the polyester is substantially the same as "homopolymer" PET.

Examples of such copolymerized monomers are isophthalic acid, triethylene glycol, 1,4-cyclohexane dimethanol, 2,6-naphthalene dicarboxylic acid, adipic acid, diethylene glycol, esterified derivatives of the foregoing, and mixtures thereof. Monomers which possess greater than two sites of functionality and, thus, may lead to crosslinking, may also be incorporated as long as the crystallization behavior of the modified polyester is substantially the same as "homopolymer" PET. Trimellitic anhydride, trimethyl trimellitate and pyromellitic dianhydride, PMDA, are examples of such monomers. PMDA is a preferred polyfunctional monomer. The level of addition of such polyfunctional monomers is typically from 0.02 to 5.0 weight percent(preferably 0.05–1.0 wt %) of the PET.

The present PET has an average apparent crystallite size of about 9 nm or more, preferably 10 nm or more, more preferably about 12 nm or more, and especially preferably about 14 nm or more. The average crystallite size is measured by wide angle X-ray powder diffraction, the method or procedure for which is as follows.

PET samples of uniform thickness for X-ray measurements are produced by cryogrinding the PET in a SPEX™ Freezer/Mill (Metuchen, N.J.) under liquid nitrogen for 30 seconds and then compressing the PET into disks approximately 1 mm thick and 32 mm in diameter. Because of the fragile nature of some of the PET disks, all disks are mounted on standard sample holders using 3M Scotch™ double-sided sticky tape. Consequently, it is necessary to collect powder diffraction patterns of the PET disks (+tape) and a tape control. While it is preferable that the sample's patterns are collected over the range 15°–19° 2θ (as shown in FIG. 2), the patterns of the samples (+tape) and a tape control can be collected over the range 10°–35° 2θ in some cases, as was obtained for some of the samples (as shown in FIG. 1). The diffraction data are collected using an automated Philips diffractometer operating in the transmission mode (CuKα radiation, curved diffracted beam monochromer, fixed step mode (0.05°/step), 65 sec./step, 1° slits, sample rotating). After subtracting the powder diffraction pattern for the tape control from each of the sample-plus-tape (sample+tape) diffraction patterns, Lorentz-polarization corrections are applied to each powder pattern.

To remove the local background scattering from the 15°–19° 2θ region of each powder pattern, a straight line extending from 15.00° to 19.00° 2θ is defined and subtracted. This region of the diffraction pattern has been found to contain two crystalline reflections, at approximately 16.5° and 17.8° 2θ, that have been defined as the $(0\overline{1}1)$ and (010) reflections, referred to by N. S. Murthy, et al., in *Polymer*, vol. 31, p. 996–1002, herein incorporated by reference.

FIGS. 1 and 2 show the diffraction patterns, corrected as detailed above, collected over the 2θ range 10°–35° and 15°–19°, respectively. In addition to the Miller indices of the reflections of interest, the local "artificial" background between 15° and 19° 2θ, labeled "b", and described above, is shown.

The 15°–19° region is then deconvoluted into two overlapping Gaussian peaks corresponding to the two crystalline reflections, and the position, width, and height of both peaks are extracted. An example of this deconvolution is shown in FIG. 3. The apparent crystallite size for the (010) reflection (herein sometimes also referred to simply as apparent crystallite size), $ACS_{010}$, is calculated from the reflection's position and full width at half height using the Scherrer equation, as for instance described by L. E. Alexander, *X-Ray Diffraction Methods in Polymer Science*, p. 335 et seq. (John Wiley & Sons, New York, 1969):

$$ACS_{010} = \frac{K\lambda}{\beta_{010}\cos\theta_{010}}$$

where $ACS_{010}$ is the mean dimension of the crystal, K is assumed to be 1.0, $\lambda$ is the wavelength, $\beta$ is the full width at half height of the profile, in radians, and $\theta$ has its normal meaning.

The PET has a melting point ($T_m$) of 270° C. or less, preferably 265° C. or less, and more preferably between 200° C. and 265° C., depending on the DP. The melting point is measured by Differential Scanning Calorimetry (DSC). The $T_m$ is taken as the maximum of the melting endotherm on the first heat. In contrast, samples of conventional PET which have been highly annealed (annealed over long periods), although they may have large crystallite sizes, also have high melting points, above 270° C.

It is also preferred if the PET has no distinct premelting endotherm. By a "premelting endotherm" is meant an endothermic peak in the DSC due to a melting endotherm at a lower temperature than (before) the main melting endotherm. By "distinct" is meant the melting occurs over a temperature range of 60° C. or less, preferably less than 40° C. By having "no distinct premelting endotherm" is meant that if one or more such endotherms are detected, the total heat of fusion is less than 1 J/g, preferably less than 0.5 J/g. Premelting endotherms are believed to be indicative of small and/or relatively imperfect crystallites, and when present, the PET particle may have a tendency to more readily stick to other particles when heated, usually at or around the temperature of a premelting endotherm, which is very undesirable in solid-state polymerization.

The PET of the present invention also has a degree of polymerization (DP) of about 5 to about 35, preferably about 10 to about 25. The DP is merely the average number of repeat units in a polymer chain and, therefore, may not necessarily be an integer. The main repeat unit of PET is

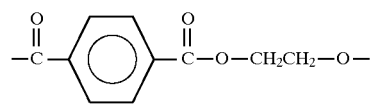

The DP can be determined by Gel Permeation Chromatography using appropriate PET standards.

The DP is merely one way of expressing the molecular weight of the PET. Another comparable measure of molecular weight is the intrinsic viscosity (IV) of the polymer. Listed below for the convenience of the reader are the IVs of PET polymers and their approximate DP's. These numbers assume that the ratio of the weight average molecular weight/number average molecular weight for the PET is "normal" for a condensation polymerization, about 2–3. The relationship between DP and IV is approximately DP=155.5 $(IV)^{1.466}$.

| DP | IV |
|---|---|
| 5 | 0.10 |
| 9.6 | 0.15 |
| 11.6 | 0.17 |

-continued

| DP | IV |
|---|---|
| 12.6 | 0.18 |
| 15.8 | 0.21 |
| 16.9 | 0.22 |
| 19.2 | 0.24 |
| 35 | 0.36 |

The PET of the present invention may be made by rapidly heating glassy PET to a certain temperature range or by cooling molten PET to that same temperature range. The PET can be in the form of particles or pellets of various size and shapes or mixtures thereof, as will be readily appreciated by the skilled artisan. By a "glassy PET" is meant a PET below its $T_g$ which contains less than about 10 weight percent crystalline PET, preferably less than about 5 percent, most preferably less than 1 weight percent. The amount of crystalline PET present can be determined by standard methods using DSC to determine the heat of fusion of the crystallites present and comparing that with the heat of fusion of "pure" crystalline PET. By a "molten PET" is meant a PET in the liquid (not glassy) state. Preferably it contains less than ten percent (10%), more preferably less than five percent (5%), and most preferably less than one percent (1.0%) crystalline PET. It is preferred if the initial temperature of the molten PET is about 255° C. or higher, preferably about 270° C. or higher, since this is approximately at or above the common melting point of PET. In order to obtain a large apparent crystallite size, it is preferred to have as little crystallinity in the starting PET as possible.

It has been found that the desired PET crystalline morphology may be formed by rapidly heating or cooling amorphous PET to a preselected temperature range. A temperature range of 120° C. to about 210° C., preferably about 150° C. to about 190° C., has been found to produce the desired result.

Accordingly, in this process, not only must a temperature gradient be imposed between the PET and its surroundings, but heat (or another appropriate form of energy) should be removed or added to the polymer at a relatively high rate. If heating, conductive and/or radiant heat as obtained in conventional ovens may be employed. For example, ovens in which heat flows primarily by radiation and/or conduction, from the surroundings, into the PET material or particle may be employed. Preferably, the heat radiation has a frequency below microwave, e.g., below 15 megahertz.

This requires that the surroundings or environment of the PET be able to transfer this heat rapidly. Preferably, the cross-sectional area of the PET should not be so large that the change of temperature of the PET is relatively rapid on the surface but inadequate or too slow in the center.

When crystallizing from molten PET, then in order to obtain rapid heat transfer into the molten PET, it is preferred if the PET is in good contact with a heat-transfer material that has a relatively high overall heat capacity (derived from both its mass and its actual heat capacity) and thermal conductance. Metals are particularly useful for this purpose, especially metals with high coefficients of heat transfer. However, coated metals, plastics and other materials may be employed for transferring heat to molten PET during crystallization.

The surface of the molten PET may be exposed to a combination of heat-transfer materials, for example, a part of the surface may be exposed to a metal surface and another part of the surface may be exposed to, for example, a gas. Although a gas may be used to transfer heat to or from the PET, the heat capacities of gases are relatively low, and so such cooling would be more difficult to achieve by itself. Liquids at the appropriate temperature may also be used, but they may be less preferred because of concerns that contamination may occur and because of the need to separate the liquid from the PET. Thus, it is preferred to at least partially cool the molten PET by contact with a heat conductive solid.

Conversely, when starting with glassy PET instead of molten PET, the glassy PET should be rapidly heated instead of cooled. One way to accomplish this is to expose the glassy PET to a very high temperature environment, about 300° C. to 800° C. or higher for up to about 120 seconds. See Examples 1 and 5 for examples of such a procedure. Generally speaking, the higher the temperature or the smaller the cross section of the PET being treated, the less time that will be needed. In forming the desired crystalline form of PET by heating or cooling, it is preferred that the entire crystallization process, i.e., heating or cooling and crystal formation, be complete in less than 5 min, more preferably less than 120 sec, more preferably less than 90 sec, and most preferably about 3 to about 60 sec. When crystallizing molten PET, the particles may be maintained at the temperature of crystallization for longer periods of time. When crystallizing glassy PET, however, prolonged exposure to the temperature of crystallization may be detrimental to the desired result.

As mentioned above, the minimum cross section of the PET, usually in the form of particles or pellets, is important in determining how fast the bulk of the PET is heated or cooled. Generally speaking, it is preferred if the maximum cross section, or its average value, for the PET which is to be heated or cooled is about 1 cm or less, more preferably about 0.6 cm or less. Preferably, the minimum cross section, or its average, is 500 nm.

The shape of the crystallized PET may vary, and may be a film, ribbon, particles of various shapes, etc. In one preferred embodiment, the PET is in the form of particles (or, more accurately, small discrete units, masses, or droplets in the case of molten PET). Crystalline PET in the form of particles is particularly useful in solid-state polymerization. Preferred forms and/or sizes for particles are spherical particles with diameters of 0.05 cm to 0.3 cm, hemispherical particles with a maximum cross section of 0.1 cm to 0.6 cm, or right circular cylinders with a diameter of 0.05 cm to 0.3 cm and a length of 0.1 cm to 0.6 cm. If shapes such as films or ribbons are formed, then if desired, they can be later ground, cut, or otherwise divided into particles, such as are suitable for solid-state polymerization. Since it is preferred if the pellets are produced on an economically advantageous commercial scale, the pellets (like the polymer product from a solid-state polymerization process) would preferably be produced and collected together in commercial quantities of greater than 10 kg, more preferably greater than 50 kg. The pellets may be used in the same plant soon after being made, stored for later use, or packaged for transport, all in commercial quantities.

Before reaching a stable shape, molten or crystallizing PET may be affected by the shape of the means into which it can flow or within which it is confined before solidification, whether such means employs physical or other forces.

Glassy PET, for use as a starting material in a crystallization process according to a method of the present invention, may be made by very rapidly cooling the appropriate molecular weight molten PET to below the glass transition temperature of PET. This can be done in bulk or while forming particles of the PET. The PET itself can be made from appropriate methods known to the artisan, see for instance B. Elvers, et al., Ed., *Ullmann's Encyclopedia of Industrial Chemistry*, Vol. A21, p. 232–237 (VCH Verlagsgesellschaft mbH, Weinheim, 1992). Such a glassy polymer may be stored or shipped (preferably in a relatively dry state) for later polymerization to higher molecular weight, whether a solid-state polymerization, melt polymerization, or other processing.

In all of the processes described herein for the crystallization of low molecular weight PET to form crystallites with relatively large apparent crystallite sizes, it is preferred that the heating or cooling, as desired, takes places in less than 120 sec., more preferably about 90 sec., and most preferably about 3 to 60 sec.

In an integrated plant for producing PET from monomeric materials, low molecular weight PET will usually be available as a molten material. Thus, it is preferred if the instant process starts with molten PET, which is then cooled. It is convenient, and therefore preferred, if the PET is formed in "particles" just before or essentially simultaneous with the cooling of the molten PET to form the desired crystalline morphology. The preferred eventual sizes and shapes of such particles are as given above.

The molten PET may be formed into particles (or, if molten, perhaps more accurately portions of PET) by a variety of methods, including pastillation. See also U.S. Pat. No. 5,340,509, prilling as described in numerous patents such as U.S. Pat. No. 4,165,420. Melt cutting, dripping (see Example 2 below), or extruding (see Example 3 below) are other alternatives.

The PET portions or particles can be conveniently cooled by contacting them with a metal surface, preferably in a controlled temperature environment, such as a conveyor belt or moving table held at the proper temperature to achieve the desired crystalline morphology. It is preferred if the PET initially contacts this metal while still largely molten, since this contact with a liquid will usually lead to better heat transfer. A regulated flow of an inert gas may be passed over the particles to increase the overall rate of cooling.

In an integrated process for producing high molecular weight PET, the low molecular weight PET having the morphology described above may be further polymerized to higher molecular weight. The PET may be melted and melt polymerized, but the crystalline PET described herein is especially suitable for use in solid-state polymerization. Solid-state polymerization is well known to the artisan. See, for instance, F. Pilati in G. Allen, et al., Ed., *Comprehensive Polymer Science*, Vol. 5, p. 201–216 (Pergamon Press, Oxford 1989), which is hereby incorporated by reference. Solid-state polymerization is particularly useful for making higher molecular weight PETs. In general, particles of PET are heated to a temperature below the melting point and a dry gas, usually nitrogen, is passed, usually concurrently in continuous operation, around and over the particles. At the elevated temperature, transesterification and polycondensation reactions proceed, and the gas can be employed to carry away the volatile products (similar other methods, such as employing a vacuum, may be used for this purpose), thereby driving the PET molecular weight higher.

In the past, a number of problems or difficulties have been associated with the solid-state polymerization of PET. In particular, the particles to be polymerized usually have had to undergo an annealing process, so that when they are heated during solid-state polymerization, they do not undergo partial melting and stick together. If, alternatively, the polymerization occurs at a relatively lower temperature to avoid sticking, this would increase the polymerization time, since the reactions which drive the molecular weight up proceed faster at higher temperatures. In either event, these difficulties or problems tend to make the solid-state polymerization process more expensive to run.

Advantageously and surprisingly, the relatively low molecular weight PET polymer with the crystalline morphology disclosed herein may be directly polymerized (preferably without further crystallization or annealing) starting at higher temperatures, for instance 230° C., preferably 240° C. The need for a lengthy annealing step, which lengthens the overall process time is thereby avoided. In addition, particles produced according to the present process may, in some cases at least, be more resistant to attrition. This would usually be advantageous where PET particles, in solid-state polymerization apparatus, tend to wear against each other or the apparatus itself. Thus, the use of the particles produced according to the present invention can result in an improved process for solid-state polymerization.

In any polymerization of low molecular weight PET to higher molecular weight PET, normal additives, such as polymerization catalysts, may be present. These may have been added when the low molecular weight PET was formed. A typical catalyst is $Sb_2O_3$, whose concentration herein is given as the level of elemental antimony. Because of the higher starting polymerization temperatures in solid state polymerization using the crystalline low molecular weight PET, as described herein, it may be possible to use lower catalyst levels while maintaining useful polymerization rates. Lower catalyst levels may be advantageous when the PET is intended for use in making certain products, for example, when the PET is intended for use in making bottles which will store beverages for human consumption.

A PET polymer product having unique properties can be produced by solid-state polymerization of the particles described herein. It is possible to obtain a PET polymer product with an intrinsic viscosity of 0.65 or more, an average apparent crystallite size of 9.0 nm or more, and a heat of fusion of 95 J/g or less. Preferably, such a PET polymer product has an intrinsic viscosity of about 0.70 or more, more preferably about 0.80 or more, and/or the average apparent crystallite size is about 10.0 nm or more, more preferably about 11.0 nm or more, and/or preferably the heat of fusion is about 90 J/g or less, more preferably about 80 J/g or less. Particularly for some bottle-resin applications, an especially preferred PET polymer product has an average apparent crystallite size of about 12.0 nm or more and a heat of fusion of about 70 J/g or less.

As described above, solid-state polymerization is usually carried out with particles of the lower molecular weight polymer, resulting in a higher molecular weight polymer that is also in the form of particles. The shape of the product may vary, including particles of various shapes. Preferred forms and/or sizes for particles are spherical particles with diameters of 0.05 mm to 0.3 mm, hemispherical particles with a maximum cross section of 0.1 mm to 0.6 mm, or right circular cylinders with a diameter of 0.05 mm to 0.3 mm and a length of 0.1 cm to 0.6 cm. Especially preferred are spherical particles flattened on one side, a shape formed before solid-state polymerization as a result of the low molecular weight polymer particle, during formation, being dropped onto a flat surface.

In the following Examples, certain analytical procedures are used. Aside from X-ray diffraction, which is described in detail above, these procedures are described below. References herein to these types of analyses, or their results, correspond to these exemplary procedures.

Intrinsic Viscosity (IV)

A solvent is made by mixing one volume of trifluoroacetic acid and three volumes of methylene chloride. PET, in the amount of 0.050 g, is then weighed into a clean dry vial, and 10 mL of the solvent is added to it using a volumetric pipette. The vial is closed (to prevent evaporation of the solvent) and shaken for 30 min or until the PET is dissolved. The solution is poured into the large tube of a #50 Cannon-Fenske™ viscometer, which is placed in a 25° C. water bath and allowed to equilibrate to that temperature. The drop times between the upper and lower marks are then measured in triplicate, and should agree within 0.4 sec. A similar measurement is made in the viscometer for the solvent alone. The IV is then calculated by the equation:

$$IV = Ln \frac{\text{(solution time/solvent time)}}{0.5}$$

Gel Permeation Chromatography (GPC)

GPC was run in a Waters™ 150C ALC/GPC instrument, using as a solvent hexafluoroisopropanol (HFIP) containing 1.3637 g of sodium trifluoroacetate per L. The instrument was run in the usual way, and standard calculations were made to determine $M_n$ (number average molecular weight) and $M_w$ (weight average molecular weight). Calibration of the instrument was made using a PET sample with $M_n$ 22,800 and $M_w$ 50,100.

Melting Point and Heat of Fusion

Melting point was determined by Differential Scanning Calorimetry (DSC) and all samples were analyzed using a TA Instruments™ DSC 910. The instrument was calibrated with indium consistent with the system documentation. The samples were analyzed as received, no pre-grinding, using 5–10 mg ±0.005 mg. The samples were sealed in aluminum pans then heated from room temperature to 300° C. at 10° C./min. in a nitrogen purged environment. Glass transition temperature, melting point temperature and heat of fusion calculations were done with the TA Instrument software. The reported DSC peak melting temperature is the corresponding temperature of the peak in the main melting endotherm.

Heats of fusion (sometimes abbreviated herein as $\Delta H_f$) were measured by DSC during the above described procedure, and are taken as the area included within the melting point endotherm. Heats of melting are reported in J/g (of polymer).

Thermomechanical Analysis

A Mettler™ TMA 40 Analyzer coupled to a TSC 10A controller was used for all samples. This instrument was calibrated for temperature using the standard operating procedure illustrated in the instruction manual at 1 month intervals or when spurious results were suspected. The samples had no extra pre-treatment in the TMA system that would alter the samples inherent morphological history. The partial hemispherical particles were loaded in the system in contact with both the quartz sample holder and a 3 mm diameter probe such that the sample was convex side up with the probe in contact with the apex of the hemisphere. Two temperature profiles were used to analyze the samples. The first being a high speed scanning rate of 10° C./min. from room temperature through the melt and the second, to ensure a homogeneous heat environment, being a 1° C. rate from 200° C. to the melt.

In the Examples, SSP means solid-state polymerization.

EXAMPLE 1

PET with an IV of 0.18 dl/g and COOH ends of 167.5 Eq/$10^6$ g was produced by a melt-phase polymerization process and contained approximately 275 ppm Sb as a catalyst. The melt was then extruded through a 1 mm diameter orifice to form droplets. The droplets fell through an air gap of about 10 cm into chilled water to form clear amorphous particles. The particles were shaped like pancakes, approximately 8 mm in diameter and 2.2 mm thick. The particles were crystallized one at a time in a Mettler™ TMA 40 coupled to a Mettler™ Thermal Controller 10A. The individual particle was placed on top of the quartz sample holder at room temperature. The oven was pre-heated to 400° C., lowered over the sample for 15 seconds, then removed allowing the particle to cool back to room temperature. After exposure in the oven the particle was opaque. DSC analysis of the crystallized sample indicated no pre-melting endotherms. The peak melting temperature was 250.1° C. The $ACS_{010}$ was 11.6 nm. The $\Delta H_f$ was 59.7 J/g.

EXAMPLE 2

PET with an IV of 0.15 dl/g, and COOH ends of 188.2 Eq/$10^6$ g, which had been produced by a melt-phase polymerization process and which contained approximately 275 ppm Sb as a catalyst, was heated in a melt indexer at 290° C. until the polymer dripped out of the orifice (1 mm in diameter) under its own weight. A hot plate covered with a 1.9 cm thick steel plate was placed 15 to 25 cm under the orifice of the melt indexer. The temperature was monitored by a thin-wire thermocouple kept in intimate contact with the steel plate. The polymer dripped onto the hot steel plate which was at 180° C. Crystallization was monitored by observing the clear amorphous drop turn into an opaque solid. Once it was opaque the metal surface was tipped at an angle to horizontal so the particle would slide off and cool to room temperature. The particles were shaped like pancakes, approximately 5.6 mm in diameter and 1.7 mm thick. DSC analysis of the crystallized sample indicated no pre-melting endotherms. The peak melting temperature was 250.3° C. The $\Delta H_f$ was 52.0 J/g. Two particles formed by this method were placed one on top of the other in a quartz sample holder in a TMA and a load of 0.5N was applied on them with the probe. The particles showed no signs of adhesion after being held for 30 minutes at 240° C. under this load.

PET with an IV of 0.24 dl/g and COOH ends of 27.8 Eq/$10^6$ g, which had been produced by a melt-phase polymerization process and which contained approximately 275 ppm Sb as a catalyst, was heated in a Melt Indexer at 290° C. until the polymer dripped out of the orifice (1 mm in diameter) under its own weight. A hot plate covered with a 1.9 cm thick steel plate was placed 15 to 25 cm under the melt indexer. The temperature was monitored by a thin-wire thermocouple kept in intimate contact with the steel plate. The polymer dripped onto the hot steel plate which was at 180° C. Crystallization was monitored by observing the clear amorphous drop turn into an opaque solid. Once it was opaque the metal surface was tipped at an angle to horizontal so the particle would slide off and cool to room temperature. The particles were shaped like hemispheres, approximately 4.5 mm in diameter and 2.5 mm thick. DSC analysis of the crystallized sample indicated no pre-melting endotherms. The peak melting temperature was 258.7° C. The $\Delta H_f$ was 51.5 J/g. Two particles formed by this method were placed one on top of the other in a quartz sample holder in the TMA and a load of 0.5N was applied on them with the probe. The particles showed no signs of adhesion after being held for 30 minutes at 240° C. under this load.

EXAMPLE 3

PET with an IV of 0.21 dl/g and COOH ends of 141.0 Eq/$10^6$ g, which had been produced by a melt-phase polymerization process and which contained approximately 275 ppm Sb as a catalyst, was melted and processed at 255°–280° C. through a 16 mm twin screw extruder at 0.5 lb/hr. The melt extruded through a 1.0 mm die forming individual droplets that fell 1.3 cm through room temperature air onto a heated turntable. The turntable provided precise regulation of surface temperature and residence time on the heated surface, with continuous particle formation from the extruder. The device consisted of a rotary actuator driven by a stepper motor, a rotating stainless steel turntable in contact with a stationary heated plate. The temperature of the turntable surface was controlled through manipulation of the temperature of the stationary plate. A calibration curve was generated for the controlled measured temperature of the stationary plate versus the surface temperature of the turntable so that a thermocouple did not have to be attached to the rotating turntable during the crystallization. After about 300° of rotation on the turntable the crystallized particles hit a block of Teflon® fluoropolymer which knocked them off the turntable and into a room temperature collection pail. For particles formed at surface temperatures between 160°–200° C. there were no premelting endotherms in the DSC traces. Processing conditions and particle analyses are listed in Table I.

TABLE I

| Run No. | Table Temp (°C.) | Time on Table (sec) | DSC Peak Melting Temp (°C.) | $\Delta H_f$ (J/g) | $ACS_{010}$ (nm) |
|---|---|---|---|---|---|
| 1 | 160 | 28 | 255.4 | 50.9 | 12.5 |
| 2 | 160 | 23 | 254.1 | 53.4 | 9.8 |
| 3 | 170 | 23 | 255.5 | 31.6 | 10.9 |
| 4 | 170 | 45 | 255.5 | 50.5 | 10.0 |
| 5 | 190 | 45 | 253.1 | 48.6 | 12.0 |
| 6 | 190 | 28 | 254.8 | 42.8 | 12.5 |
| 7 | 200 | 45 | 254.4 | 39.1 | 13.8 |
| 8 | 200 | 60 | 254.2 | 52.3 | 12.6 |

EXAMPLE 4

PET with an IV of 0.17 dl/g and COOH ends of 98.0 Eq/$10^6$ g, which had been produced by a melt-phase polymerization process and which contained approximately 275 ppm Sb as a catalyst, was melted and processed through a Prism 16 mm twin screw extruder and dropped onto a heated turntable as described in Example 3. Processing conditions and particle analyses are listed in Table II.

TABLE II

| Run No. | Turntable Temperature (°C.) | Time on Turntable (sec) | DSC Peak Melting Temperature (°C.) | $\Delta H_f$ (J/g) | $ACS_{010}$ (nm) |
|---|---|---|---|---|---|
| 1 | 120 | 10 | 251.9 | 58.8 | 11.3 |
| 2 | 120 | 28 | 251.9 | 56.8 | 11.7 |
| 3 | 120 | 60 | 251.5 | 56.1 | 11.4 |
| 4 | 160 | 28 | 251.8 | 58.0 | 13.6 |
| 5 | 160 | 60 | 251.9 | 56.9 | 16.2 |
| 6 | 170 | 28 | 252.6 | 54.8 | 13.4 |
| 7 | 200 | 60 | 252.3 | 57.9 | 15.2 |

EXAMPLE 5

PET with an IV of 0.18 dl/g and COOH ends of 132.1 Eq/$10^6$ g, which was produced by a melt-phase polymerization process and which contained approximately 275 ppm Sb as a catalyst, was prilled to form clear amorphous particles. About 100 g of particles were placed on a piece of Kapton® polyimide film (3 mil thick) which was placed on a room temperature ceramic plate. The particles, film and plate were then placed in a Fisher Scientific model 497 high temperature oven for 15 seconds at 500° C. The particles were removed from the oven and allowed to cool to room temperature. The oven dimensions were 30.5 cm×30.5 cm×35.6 cm and the ceramic plate was placed in the center of the oven. The crystallized particles showed no premelting endotherms in the DSC trace. Fifty grams of particles were loaded into a glass tube (5.1 cm D×40.6 cm H) that was surrounded by a larger diameter glass tube. A controlled volumetric flow rate and temperature of nitrogen passed through a porous disk distributor at the bottom of the column and then through the 5.1 cm D reactor. Heated air passed through the outside glass tube to insulate the reactor from heat loss. When necessary to provide particle motion, as when conventional crystallization was occurring, an agitator shaft with three propeller blades at various heights within the column was slowly rotated.

TSC below means Thermal Shock Crystallization.

Program for 0.18 IV, TSC, SSP @210° C.

| Duration (min) | $N_2$ Flow (1/min) | Air Flow (1/min) | $N_2$ Temp (°C.) | Air Temp (°C.) | Agitator |
|---|---|---|---|---|---|
| 15 | 200 | 150 | 25 to 210 | 25 to 210 | on |
| 1440 | 40 | 150 | 210 | 210 | off |
| 15 | 200 | 150 | 210 to 25 | 210 to 25 | off |

Samples were taken at 0, 6 and 24 hours for analysis:

Analysis of 0.18 Particles TSC, SSP @210° C.

| Time (hr) | IV (dl/gm) | DSC Peak Melting Temperature (°C.) | $\Delta H_f$ (J/g) | $ACS_{010}$ (nm) |
|---|---|---|---|---|
| 0 | 0.18 | 254.5 | 66.5 | 10.7 |
| 6 | 0.19 | 263.5 | 83.3 | — |
| 24 | 0.46 | 267.8 | 94.2 | 13.5 |

50 gm of the TSC particles were also solid state polymerized at 240° C. under the following conditions:

Program for 0.18 IV, TSC, SSP @240° C.

| Duration (min) | N₂ Flow (1/min) | Air Flow (1/min) | N₂ Temp (°C.) | Air Temp (°C.) | Agitator |
|---|---|---|---|---|---|
| 15 | 200 | 150 | 25 to 240 | 25 to 240 | on |
| 1440 | 40 | 150 | 240 | 240 | off |
| 15 | 200 | 150 | 240 to 25 | 240 to 25 | off |

Samples were taken at 0, 6 and 24 hours for analysis:

Analysis of 0.18 Particles TSC, SSP @ 240° C.

| Time (hr) | IV (dl/gm) | DSC Peak Melting Temperature (°C.) | $\Delta H_f$ (J/g) | $ACS_{010}$ (nm) |
|---|---|---|---|---|
| 0 | 0.18 | 254.5 | 66.5 | 10.7 |
| 6 | 0.53 | — | — | — |
| 24 | 1.14 | 282.0 | 83.3 | 12.2 |

About 50 g of the same amorphous material were crystallized for 16 h at 90° C. DSC of this material showed a small crystallization peak at 117° C. that extended to the main melting endotherm, indicating that the particles were still partially amorphous. The main melting peak was at 255.5° C. This material was further crystallized and solid state polymerized at 210° C. under the following conditions:

Program for 0.18 IV, Conventionally Crystallized, SSP @210° C.

| Duration (min) | N₂ Flow (1/min) | Air Flow (1/min) | N₂ Temp (°C.) | Air Temp (°C.) | Agitator |
|---|---|---|---|---|---|
| 60 | 200 | 150 | 25 to 210 | 25 to 210 | on |
| 60 | 200 | 150 | 210 | 210 | on |
| 1440 | 40 | 150 | 210 | 210 | off |
| 15 | 200 | 150 | 210 to 25 | 210 to 25 | off |

Samples were taken at 0, 6 and 24 hours for analysis.

Analysis of 0.18 Particles Conventionally Crystallized, SSP @210

| Time (hr) | IV (dl/gm) | DSC Peak Melting Temperature (°C.) | $\Delta H_f$ (J/g) | $ACS_{010}$ (nm) |
|---|---|---|---|---|
| 0 | 0.18 | 255.5 | 71.0 | too amorphous |
| 6 | 0.22 | 251.8 | 79.3 | — |
| 24 | 0.20 | 261.7 | 88.3 | 8.8, 8.5 |

EXAMPLE 6

Pyromellitic dianhydride (PMDA) was first combined with PET prepolymer (with an IV of approximately 0.20 dl/g and COOH ends at 50 Eq/10⁶ g) to make a 2% masterbatch, then this masterbatch was further combined with the same PET prepolymer to generate a series of samples containing 0% (control, 0.01, 0.05 and 0.10 wt % PMDA. This material was crystallized by the process of Example 3. The resulting particles (17–18 mg) were then solid state polymerized at 230° C. and 240° C. for 24 hours.

Resulting IV and rate of IV increase (units for the rate, dIV/dt: IV/hr) is tabulated.

| Sample Wt % PMDA | 230° C. (IV rate) | 240° C. IV (rate) |
|---|---|---|
| 0.00 (control) | 0.424 (0.0093) | 0.539 (0.0141) |
| 0.02 | 0.475 (0.0115) | 0.496 (0.0123) |
| 0.05 | 0.484 (0.0118) | 0.573 (0.0155) |
| 0.10 | 0.535 (0.0140) | 0.732 (0.0222) |

What is claimed is:

1. A composition, comprising, modified poly(ethylene terephthalate), having 0.02 to 5.0 wt % of an additive possessing greater than two sites of functionality, having a degree of polymerization of about 5 to about 35, an average apparent crystallite size of 9 nm or more, and a melting point of 270° C. or less.

2. The composition as recited in claim 1 wherein the additive is selected from the group consisting of trimellitic anhydride, trimethyl trimellitate and pyromellitic dianhydride.

3. The composition as recited in claim 1 wherein said average apparent crystallite size is about 12 nm or more.

4. The composition as recited in claim 3 wherein said average apparent crystallite size is about 14 nm or more.

5. The composition as recited in claim 1 wherein said melting point is 265° C. or less.

6. The composition as recited in claim 1 wherein said degree of polymerization is about 10 to about 25.

7. The composition as recited in claim 6 wherein said average apparent crystallite size is about 12 nm or more, and said melting point is 265° C. or less.

8. The composition as recited in claim 1 wherein said modified poly(ethylene terephthalate) comprises up to 5 mol percent of comonomers other than ethylene terephthalate repeat units.

9. The composition as recited in claim 1 wherein said modified poly(ethylene terephthalate) comprises comonomers selected from the group consisting of isophthalic acid, triethylene glycol, 1,4-cyclohexane dimethanol, 2,6-naphthalene dicarboxylic acid, adipic acid, esters of the foregoing, diethylene glycol, and mixtures thereof.

10. Particles of the composition of claim 1.

11. The particles as in claim 10 having an average apparent diameter of 500 micrometers to 2 cm.

12. The particles as recited in claim 10 wherein said average apparent crystallite size is about 12 nm or more.

13. The particles as recited in claim 12 wherein said average apparent crystallite size is about 14 nm or more.

14. The particles as recited in claim 10 wherein said melting point is about 265° C. or less.

15. The particles as recited in claim 10 wherein said degree of polymerization is about 10 to about 25.

16. The particles as recited in claim 10 wherein the particles are spherical, semi-spherical, cylindrical, or pancake-like in shape.

17. A process for crystallizing poly(ethylene terephthalate), comprising, cooling at a rate sufficient to cool a molten poly(ethylene terephthalate), or heating at a sufficient rate to heat a glassy poly(ethylene terephthalate), to a temperature of about 120° C. to about 210° C., to produce a crystalline poly(ethylene terephthalate) having an average crystallite size of 9 nm or more and a melting point of 270° C. or less, provided that said poly(ethylene terephthalate) has a degree of polymerization of about 5 to about 35, said polyethylene terephthalate having 0.02 to 5.0 wt % of an additive possessing greater than two sites of functionality.

18. The process of claim 17 wherein the additive is selected from the group consisting of trimellitic anhydride, trimethyl trimellitate and pyromellitic dianhydride.

19. The process as recited in claim 17 wherein said temperature is about 150° C. to about 190° C.

20. The process as recited in claim 16 wherein said degree of polymerization is about 10 to about 25, said average crystallite size is about 12 nm or more, and said melting point is about 265° C. or less.

21. The process as recited in claim 17 wherein said crystallizing is carried out in about 2 minutes or less.

22. The process as recited in claim 17 wherein said poly(ethylene terephthalate) is in the form of a particle.

23. The process as recited in claim 17 comprising the additional step of solid-state polymerization of said crystalline poly(ethylene terephthalate) wherein an initial temperature in said solid-state polymerization is about 230° C. or more.

24. A process for the solid-state polymerization of poly(ethylene terephthalate), containing 0.02 to 5.0 wt % of an additive possessing greater than two sites of functionality, wherein the improvement comprises, starting with poly(ethylene terephthalate) having an average crystallite size of 9 nm or more, a melting point of 270° C. or less, and a degree of polymerization of about 5 to about 35.

25. The process of claim 24 wherein the additive is selected from the group consisting of trimellitic anhydride, trimethyl trimellitate and pyromellitic dianhydride.

26. The process as recited in claim 24 wherein said average crystallite size is about 12 nm or more.

27. The process as recited in claim 24 wherein said average crystallite size is about 14 nm or more.

28. The process as recited in claim 24 wherein said melting point is about 265° C. or less.

29. The process as recited in claim 24 wherein said degree of polymerization is about 10 to about 25.

30. The process as recited in claim 29 wherein said average crystallite size is about 12 nm or more, and said melting point is about 265° C. or less.

31. The process as recited in claim 24 wherein an initial temperature is about 230° C. or more.

32. A polymer product comprising polyethylene terephthalate polymer, containing 0.02 to 5.0 wt % of an additive possessing greater than two sites of functionality, having an intrinsic viscosity of 0.65 or more, an average apparent crystallite size of 9.0 nm or more, and a heat of fusion of 95 J/g or less.

33. The polymer product of claim 32 wherein the additive is selected from the group consisting of trimellitic anhydride, trimethyl trimellitate and pyromellitic dianhydride.

34. The polymer product as recited in claim 33 which has an intrinsic viscosity of about 0.70 or more.

35. The polymer product as recited in claim 33 which has an average apparent crystallite size of about 10.0 nm or more.

36. The polymer product as recited in claim 33 which has a heat of fusion of about 90 J/g or less.

37. The polymer product as recited in claim 33 having an intrinsic viscosity of about 0.70 or more, an average apparent crystallite size of about 10.0 nm or more, and a heat of fusion of about 90 J/g or less.

38. The polymer product as recited in claim 33 or in the form of particles.

39. The polymer as recited in claim 38 wherein the particles are spherical, semi-spherical, cylindrical, or pancake-like in shape.

40. The product of the process of claim 24.

41. The product of the process of claim 24 which product has an intrinsic viscosity of 0.65 or more, an average apparent crystallite size of 9.0 nm or more, and a heat of fusion of 95 J/g or less.

42. The composition or process of claim 1 or claim 17 or claim 24 or claim 32 wherein the wt % of additive is 0.05 to 1.0.

* * * * *